United States Patent
Li et al.

(10) Patent No.: US 10,541,414 B2
(45) Date of Patent: Jan. 21, 2020

(54) CATHODE MATERIAL OF LITHIUM COBALT OXIDE FOR A LITHIUM ION SECONDARY BATTERY AND PREPARATION METHODS AND APPLICATIONS THEREOF

(71) Applicant: Guizhou Zhenhua E-CHEM Inc., Guiyang (CN)

(72) Inventors: Lu Li, Guiyang (CN); Xingping Wu, Guiyang (CN); Maogang Fu, Guiyang (CN); Ansheng Hu, Guiyang (CN); Ming Mei, Guiyang (CN); Xin Huang, Guiyang (CN); Qianxin Xiang, Guiyang (CN)

(73) Assignee: GUIZHOU ZHENHUA E-CHEM INC., Guiyang (CN)

(*) Notice: Subject to any disclaimer, the term of this patent is extended or adjusted under 35 U.S.C. 154(b) by 322 days.

(21) Appl. No.: 15/498,527

(22) Filed: Apr. 27, 2017

(65) Prior Publication Data
US 2018/0006302 A1 Jan. 4, 2018

(30) Foreign Application Priority Data
Jul. 1, 2016 (CN) .......................... 2016 1 0519257

(51) Int. Cl.
*H01M 4/64* (2006.01)
*H01M 4/525* (2010.01)
(Continued)

(52) U.S. Cl.
CPC ........... *H01M 4/525* (2013.01); *H01M 4/131* (2013.01); *H01M 4/1391* (2013.01);
(Continued)

(58) Field of Classification Search
CPC .... H01M 4/525; H01M 4/131; H01M 4/1391; H01M 4/366; H01M 4/505; H01M 10/0525
See application file for complete search history.

(56) References Cited

U.S. PATENT DOCUMENTS

| | | | |
|---|---|---|---|
| 2011/0309290 A1 | 12/2011 | Paulsen et al. | |
| 2015/0104708 A1* | 4/2015 | Bi .................. | H01M 4/525 429/220 |
| 2017/0317342 A1 | 11/2017 | Kang et al. | |

FOREIGN PATENT DOCUMENTS

| CN | 101388451 | 3/2009 |
|---|---|---|
| JP | 2008198553 | 8/2008 |
| WO | WO 2016-053056 A1 | 4/2016 |

* cited by examiner

*Primary Examiner* — Jane J Rhee
(74) *Attorney, Agent, or Firm* — Lathrop Gage LLP

(57) ABSTRACT

The invention relates to a cathode material of lithium cobalt oxide for a lithium ion secondary battery and preparation methods and applications thereof. A cathode material comprises a core material and a coating layer, wherein the core material is $Li_xCo_{(1-y)}A_yO_{(2+z)}$, wherein $1.0 \leq x \leq 1.11$, $0 \leq y \leq 0.02$, $-0.2 < z < 0.2$, and A is one or two or more selected from the group consisting of Al, Mg, Y, Zr and Ti, wherein the coating layer is $Li_aM_bB_cO_d$, wherein M is a lithium ion active metal element and one or two or more selected from the group consisting of Co, Ni, Mn and Mo, and B is an inactive element, and one or two or more selected from the group consisting of Al, Mg, Ti, Zr and Y, and $0.95 < b+c < 2.5$, and the molar ratio of Li to the active metal element M is $0 < a/b < 1$. The battery prepared by the cathode material has advantages of high capacity, high compacted density and excellent cycling stability etc., under high voltage.

49 Claims, 2 Drawing Sheets

(51) Int. Cl.
*H01M 4/131* (2010.01)
*H01M 4/1391* (2010.01)
*H01M 4/36* (2006.01)
*H01M 4/505* (2010.01)
*H01M 10/0525* (2010.01)

(52) U.S. Cl.
CPC .......... *H01M 4/366* (2013.01); *H01M 4/505* (2013.01); *H01M 10/0525* (2013.01)

CATHODE MATERIAL OF LITHIUM COBALT OXIDE FOR A LITHIUM ION SECONDARY BATTERY AND PREPARATION METHODS AND APPLICATIONS THEREOF

RELATED APPELLATIONS

This application claims priority to CN 201610519257.7, filed Jul. 1, 2016, the contents of which are incorporated herein by reference.

FIELD OF THE INVENTION

The present invention relates to a technical field of a lithium ion secondary battery, mainly relates to a cathode material of lithium cobalt oxide for a lithium ion secondary battery and preparation methods and applications thereof, especially relates to a cathode material of lithium cobalt oxide for a lithium ion secondary battery and preparation methods and applications thereof which are suitable for high voltage environment.

BACKGROUND OF THE INVENTION

With continuously increasing of energy density requirements for a lithium-ion secondary battery by the user, the applied charging cut-off voltage of lithium cobalt oxide is increased from the early 4.2V to the current 4.35V or more, while the compacted density of that is increased from the early 3.80 g/cm$^3$ to the current 4.15 g/cm$^3$ or more through matching optimization of particle size. The deterioration problem of the cycling stability of lithium cobalt oxide under the application of high voltage is brought about by increasing the charging cut-off voltage to enhance the deintercalation degree of lithium ions for the layer structure of lithium cobalt oxide to increase the capacity. In view of this problem, corresponding solutions are opened by many literature and patents, and mainly can be summarized as the following categories:

(1) Stabilizing the structural stability of the O—Co—O layer by multiple cationic or anionic doping to suppress irreversible structural changes in the application of high voltage cycles. The anions involved mainly are F, S. The cations involved are mainly composed of divalent to tetravalent cations and contain many kinds of elements, such as Mg, Ca, Sr, Ba, B, Al, Ga, In, Y, Ce, Ti, Zr, V, Cr, Mo, W, Mn, Fe, Ni, Cu, Ag, Zn, and so on, covering almost all possible elemental ranges (U.S. Pat. No. 7,459,238B2, U.S. Pat. No. 7,026,068B2, U.S. Pat. No. 8,178,238B2, etc.). However, not all of the cationic elements are suitable to be doped elements of lithium cobalt oxide. For example, Cu, Fe, Zn are considered to be dangerous elements to affect the self-discharge and safety of lithium cobalt oxide battery, and there is a need to strictly control their content to ppm level; and in other elements which have been disclosed, only a few can be used to make lithium cobalt oxide crystal grow smoothly to 18-25 μm, in order to obtain a higher compacted density through matching of particle size. Although there is a certain effect on the cycling stability of lithium cobalt oxide under high voltage through doping of surplus few elements, its effect is limited. Too many doping amounts will affect the deintercalation/intercalation kinetic properties of lithium ions, which can not fully meet application requirements of lithium cobalt oxide in a voltage of 4.45V or more.

(2) The surface of lithium cobalt oxide is protected through being coated by multiple inactive elements. The common coating elements include Al, Mg, Ti, Zr, Y, Mo, etc. Usually, simple element coating has a greater impact on the deintercalation/intercalation dynamics, resulting in deterioration of capacity, magnification and low temperature performance, meanwhile, with reference to the cycling stability under high voltage, it also can not fully meet application requirements of lithium cobalt oxide in a voltage of 4.45 V or more by simple element coating.

(3) The coating layer has lithium ion deintercalation/intercalation activity. Typically, the inner core is doped or undoped lithium cobalt oxide, and the shell coating layer has a lithium ion deintercalation/intercalation activity. For example, in a Li—Ni—Mn—O coating patent by Sony Company and 5V material (such as LiCoPO$_4$) coating patent by other companies, this method can improve the cycling stability of lithium cobalt oxide under high voltage, while overcoming a variety of issues brought by the simple bulk phase doping or inactive elements coating. Influences of the molar ratio of Li to active element (Ni+Mn) in the coating layer on the high voltage cycling stability is not mentioned in the Li—Ni—Mn—O coating patent (U.S. Pat. No. 7,906,239B2, U.S. Pat. No. 8,445,129B2, U.S. Pat. No. 8,748,042B2, U.S. Pat. No. 9,190,660B2) of Sony Company.

SUMMARY OF THE INVENTION

The technical problem to be solved in the present invention is that the cycling stability of cathode materials for lithium cobalt oxide deteriorates with the increase of the charging cut-off voltage in the application of high voltage of 4.30V or more, especially when the charging cut-off voltage is greater than or equal to 4.4V, the cycling stability of cathode materials for lithium cobalt oxide is particularly seriously deteriorated. The inventions so far have not considered the influence of the proportion of an active element of Li to the cycling stability under high pressure. On the basis of experimental demonstration and theoretical analysis, the inventors in the present invention think that the molar ratio of Li to active elements in the coating layer has a vital effect on the cycling stability of lithium cobalt oxide under high voltage, and not all of the ratios have a favorable effect. When forming a lithium-depleted coating layer, the appropriate molar ratio of Li to active elements can assure the structural stability of the coating layer in the high-voltage state, so that the high voltage cycling stability of the materials can be significantly improved. At the same time, in addition to Ni, Mn, Mo involved in the patents, active elements should also be extended to the other possible lithium ion active elements (ie, Li-M oxide or Li-M salts with lithium ion deintercalation/intercalation activity), for example Co. The existence of Co element in the coating layer is helpful to reduce the structural difference between the coating layer and the bulk phase core lithium cobalt oxide, in order to improve the deintercalation/intercalation dynamics of the lithium ion in the high voltage cycle and further stabilize the high voltage cycling stability of the coating layer.

An object of the present invention is to provide a cathode material of high-voltage lithium cobalt oxide for a commercial lithium ion secondary battery, preparation methods thereof, and a lithium ion secondary battery prepared by the cathode material. The cathode material of high-voltage lithium cobalt oxide is characterized by comprising of an inner core lithium cobalt oxide and a lithium-depleted surface coating layer (a molar ratio of Li element to active metal elements is less than 1 in the coating layer), and has a layer structure feature by X-ray diffraction spectrum. The lithium ion secondary battery prepared by the cathode material of high-voltage lithium cobalt oxide in the present invention has advantages of high capacity, high compacted density and high voltage cycling stability etc.

In order to solve the above-mentioned technical problems, the present invention provides a cathode material of lithium cobalt oxide under conditions of high voltage of more than 4.30V, in particular, high voltage of 4.45V to 4.6V, and its preparation methods, and a lithium ion secondary battery prepared by the cathode material.

The inventors in the present invention found that when the lithium cobalt oxide surface is coated with a lithium-deficient active layer, the cycling stability of lithium cobalt oxide under high voltage application can be greatly improved by high-temperature sintering at 900 to 1100° C., so as to achieve comprehensive electrochemical properties beyond the general multi-doping coating methods.

In order to achieve the above-mentioned objective, the present invention adopts the following solutions:

A cathode material of high-voltage lithium cobalt oxide of a lithium-ion secondary battery is characterized by comprising an inner core material of $Li_xCo_{(1-y)}A_yO_{(2+z)}$ and a lithium-depleted active surface coating layer, with a layer structure shown by X-ray diffraction spectrum. Wherein, in the inner core lithium cobalt oxide material, $1.0 \leq x \leq 1.11$, $0 \leq Y \leq 0.02$, $-0.2 < Z < 0.2$, (the existence of the fluctuation range of oxygen content z is difficult to be quantitatively measured, can be understood as micro fluctuation brought by different valence state of doped elements or excess lithium or lattice oxygen defect, and the value of which can be estimated by balancing the valence state of elements), A is one or two or more of Al, Mg, Ti, Zr and Y. The coating layer is the lithium-depleted layer which can be denoted as $Li_aM_bB_cO_d$, wherein M is a lithium ion active metal element (i.e., Li-M oxide or Li-M salt with lithium ion deintercalation/intercalation activity) including but not limited to one or two or more of Co, Ni, Mn and Mo; wherein B is an inactive doped element of the surface coating layer and is one or two or more of Al, Mg, Ti, Zr, and Y, with $0.95 < b+c < 2.5$ and $1.8 < d < 4.2$. The formation of the lithium-depleted surface coating layer requires the addition of a certain amount of the lithium-containing compound, and the molar ratio of Li to the transition metal M is $0 < a/b < 1$, wherein d is the oxygen molar ratio of the oxide formed in the surface coating layer after sintering, and can be calculated according to the electrical neutrality principle.

Preparation methods of the above materials are given as follows:

(1) The inactive element A-doped lithium cobalt oxide having a particle diameter D50 (volume) of between 2 μm and 25 μm (preferably 14 μm to 17 μm) is used as a core material, and the selected core material can be a mixture of a large granule of lithium cobalt oxide (an average particle diameter D50 of 15 μm to 25 μm) and a small granule of lithium cobalt oxide (an average particle diameter D50 of 2 μm to 12 μm). The role of inactive element A is to stabilize the O—Co—O layer in the bulk phase structure, and the choice of inactive doped elements A should be based on the following three points:

(a) Avoid the use of metal elements such as Cu, Fe, and Zn, which can cause major hidden danger of safety or self-discharge performance of lithium-ion batteries, to avoid major hidden danger may be caused by non-uniformity in industrial production conditions.

(b) Minimize the influence on deintercalation/intercalation kinetics of lithium ions and the growth kinetics of lithium cobalt oxide crystals.

(c) Stabilize the structure of lithium cobalt oxide under high voltage cycle by synergistic effect as much as possible.

(2) Preferably, the molar ratio of the added lithium to the active coating element M should be controlled in the range of 0.1-0.9 in coating process. The multiple coating treatments of active element M/inactive element B on the core material surface include but are not limited to mechanical mixing, co-precipitation, emulsification and so on.

If the molar ratio of Li/M is too low, it is detrimental to the deintercalation/intercalation kinetics of the lithium ions in the active coating layer, and it is easy to form inactive oxides of M on the surface of the material (lithium ions can not be deintercalated internally) which influence material properties. If the molar ratio of Li/M is too high, it will reduce the structural stability of the active coating layer under high voltage cycle, and at the same time affect the deintercalation/intercalation dynamics of lithium ions under high voltage cycling.

The active coating elements M include, but are not limited to, Co, Ni, Mn, Mo, but should not contain metal elements such as Cu, Fe, Zn which may cause major hidden danger of safety and self-discharge performance of the lithium ion battery, to avoid major hidden danger may be brought about by non-uniformity under industrial production conditions. Its role is to increase lithium ion deintercalation/intercalation kinetic performance in the surface coating layer and provide a lithium ion deintercalation/intercalation framework for the lithium-depleted active coating layer. The inventors in the present invention have found that the addition of Co element to the coating layer contributes to the reduction of the structural difference between the coating layer and the bulk phase lithium cobalt oxide, in order to improve the deintercalation/intercalation kinetic performance of the lithium ion in the high voltage cycle and to further stabilize the high voltage cycling stability of the coating layer.

The role of the inactive coating element B is to synergize with the active element to further stabilize the high voltage cycling stability of the active lithium-depleted coating. The surface inactive element B differs from the core inactive element A in that the surface inactive element B is difficult to diffuse deeply into the core lithium cobalt oxide structure under the specified sintering conditions and is thus heavily enriched in the surface active coating layer, which can stabilize the lithium-depleted surface structure while minimizing the effect on the deintercalation/intercalation kinetic properties of the overall lithium cobalt oxide material as much as possible.

The present inventors have found through studies that the structural stability of the coating layer at a high voltage state can be greatly improved in the case where the coating layer is lithium-deficient, so as to obtain excellent energy density, dynamic performance, and high voltage cycling stability.

(3) Conducting at least one high-temperature sintering to the coated material to form an active coating layer of a lithium-depleted surface, with a maximum sintering temperature between 900 and 1100° C., and an isothermal time at maximum temperature between 2 and 24 hours. The purpose of the maximum temperature sintering is to form a kinetically favorable and stable lithium-depleted active coating layer.

When the sintering temperature is too high, too much Li loss will affect the capacity of materials, while lithium cobalt oxide has a risk of decomposition. When the sintering temperature is too low, a favorable and stable lithium-depleted structure can not be formed on the surface.

(4) The structures of the surface-active coating layer include, but are not limited to, lamellar, spinel, olivine, and various corresponding type of structures transformed in the deintercalation/intercalation process (knownly, the structures of cathode materials for lithium ion batteries with a structure of lamellar, spinel or olivine will change in the process of lithium deintercalation/intercalation, so that the lattice structure of the coating layer in the case of lithium deficiency should be similar to the structures of corresponding materials formed after deintercalation), preferably lamellar and spinel structures, and their corresponding types of structures transformed in the deintercalation/intercalation process. Since there is no absolute homogeneity in industrial production, surface active elements and inactive elements may form small amounts of inactive oxides of lithium on the surface of the material. However, after the formation of lithium-depleted coating layer, the X-ray diffraction spectrum of the material is basically shown as a layer structure characteristic, and it is preferable that there is no residual miscellaneous peak.

Specifically, the present invention provides the following technical solutions to the deficiencies of the prior art:

A cathode material of lithium cobalt oxide for a lithium ion secondary battery is characterized by comprising a core material and a coating layer;

wherein the core material is $Li_xCo_{(1-y)}A_yO_{(2+z)}$, wherein $1.0 \le x \le 1.11$, $0 \le y \le 0.02$, $-0.2 < z < 0.2$, and A is one or two or more selected from the group consisting of Al, Mg, Y, Zr, and Ti in the core material;

wherein the coating layer is $Li_aM_bB_cO_d$, wherein M is a lithium ion active metal element, which is one or two or more selected from the group consisting of Co, Ni, Mn and Mo, and B is an inactive element, which is one or two or more selected from the group consisting of Al, Mg, Ti, Zr, and Y, and $0.95 < b+c < 2.5$, and the molar ratio of Li to active metal element M is $0 < a/b < 1$.

Preferably, in the above-mentioned cathode material, the weight percentage of lithium ion active metal M accounts for 0.1 wt. % to 10 wt. %, preferably 0.8 wt. % to 8.5 wt. %, more preferably 3 wt. % to 8.5 wt. % of the cathode material in the coating layer.

Preferably, in the above-mentioned cathode material, the molar ratio of Li to the active metal element M is $0.1 \le a/b \le 0.9$, and preferably $0.4 \le a/b \le 0.9$.

Preferably, in the above-mentioned cathode material, b is more than 0.3 and less than 2 in the coating layer.

Preferably, in the above-mentioned cathode material, b/(b+c) is more than 0.3 and less than 1 in the coating layer.

Preferably, in the above-mentioned cathode material, the active metal element M is one or two or more selected from the group consisting of Ni, Mn and Co.

Preferably, in the above-mentioned cathode material, the active metal element includes Ni and Mn.

Preferably, in the above-mentioned cathode material, the active metal elements are Ni and Mn.

Preferably, in the above-mentioned cathode material, the active metal elements are Co, Ni and Mn.

Preferably, in the above-mentioned cathode material, y is more than or equal to 0 and less than or equal to 0.01, preferably y is more than or equal to 0.005 and less than or equal to 0.01 in the core material.

Preferably, in the above-mentioned cathode material, z is more than or equal to −0.1 and less than or equal to 0.1 in the core material.

Preferably, in the above-mentioned cathode material, the structure of the cathode material is selected from the group consisting of $\alpha$-NaFeO$_2$ layer, spinel or olivine structure.

Preferably, in the above-mentioned cathode material, the X-ray diffraction spectrum of the cathode material is shown as an $\alpha$-NaFeO$_2$ layer structure containing (003), (104), (110), (018), (012) and (006) characteristic peaks, wherein, the ratio of the (003) characteristic peak intensity to the (104) characteristic peak intensity is greater than 1.0.

Preferably, in the above-mentioned cathode material, the X-ray diffraction spectrum of the cathode material is shown as an $\alpha$-NaFeO$_2$ layer structure, and the ratio of the (110) characteristic peak intensity to the (018) characteristic peak intensity is between 0.5 and 1.4.

Preferably, in the above mentioned cathode material, the X-ray diffraction spectrum of the cathode material is shown as an $\alpha$-NaFeO$_2$ layer structure, and the ratio of the (012) characteristic peak intensity to the (006) characteristic peak intensity is between 0.2 and 2.5.

Preferably, in the above-mentioned cathode material, the particle diameter of the core material is 5 μm to 25 μm, preferably 14 μm to 17 μm.

The present invention also provides a preparation method for preparing the cathode material, which is characterized by comprising the following steps:

mixing a compound containing constituent elements of the coating layer as raw materials according to the stoichiometric ratio, adding the core material and sintering the obtained mixture to obtain the cathode material.

Preferably, in the above mentioned preparation method, the compound is selected from the group consisting of oxides, hydroxides, oxyhydroxides, carbonates, sulfates, nitrates and organometallic compounds of the constituent elements.

Preferably, in the above mentioned preparation method, the organometallic compound is selected from oxalates or acetates.

Preferably, in the above mentioned preparation method, the process of sintering includes the following steps:

a first sintering in the temperature range of 900 to 1100° C. for a period of 2 to 24 hours.

Preferably, in the above-mentioned preparation method, the process of sintering further comprises the following steps:

a second sintering in the temperature range of 600 to 1100° C. for a period of 2 to 24 hours.

Preferably, in the above-mentioned preparation method, the preparation method of the core material comprises the following steps:

mixing a compound containing constituent elements of the core material as raw materials according to the stoichiometric ratio, and sintering the obtained mixture at 900 to 1100° C. to obtain the core material.

Preferably, in the above-mentioned preparation method of the core material, the compound is selected from the group consisting of oxides, hydroxides, oxyhydroxides, carbonates, sulfates, nitrates or organometallic compounds of the constituent elements.

The present invention also provides a cathode material composition for a lithium ion secondary battery, which is characterized by comprising the above-mentioned cathode material in a weight fraction of 40% to 100%.

The present invention also provides a positive electrode of a lithium ion battery prepared by a raw material containing the above-mentioned cathode material as a cathode active material.

The present invention also provides a lithium ion battery prepared by using the above-mentioned positive electrode of a lithium ion battery.

The invention also provides the use of the cathode material, the cathode material composition for a lithium ion secondary battery, the positive electrode for a lithium ion battery or the lithium ion battery in the lithium electric energy field.

The advantages of the invention are that: using the cathode material of the high-voltage lithium cobalt oxide and the preparation method thereof in the present invention to conduct composite lithium-depleted coating on the surface of the lithium cobalt oxide to form a doped lithium-depleted coating layer, which have advantages of further improve the high-voltage cycling stability of lithium cobalt oxide, especially the cycling stability in high temperature conditions based on programs in previous literature and patents, thus provide more excellent overall performance, and provide workable solution for application of lithium cobalt oxide in the 4.45V to 4.6V and does not find related discussions in other patents and literature.

EMBODIMENT

Figure 1:
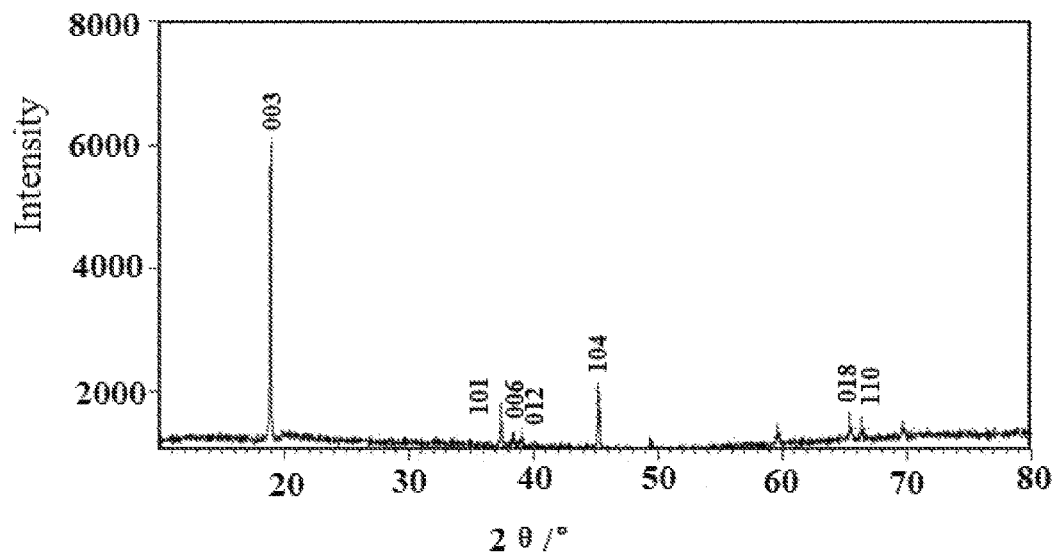
FIG. 1 is an X-ray diffraction pattern of a lithium-depleted active coated lithium cobalt oxide according to Example 1 of the present invention.

In view of the fact that the cycling stability of lithium cobalt oxide cathode material deteriorates with the increase of the charging cut-off voltage, and the cycling stability of the lithium cobalt oxide cathode material deteriorates seriously particularly when the charging cut-off voltage is equal to or more than 4.4 V. The present invention provides a modified cathode material of lithium cobalt oxide for a lithium ion secondary battery which is suitable for a high voltage environment and its preparation methods and applications thereof.

In one preferred embodiment, the cathode material of lithium cobalt oxide for a lithium ion secondary battery is composed of an inner core material of $Li_xCo_{(1-y)}A_yO_{(2+z)}$ and a lithium-depleted active surface coating layer in the present invention, which is basically shown as the $\alpha$-$NaFeO_2$ layer structure by the X-ray diffraction spectrum. Wherein, in the inner core lithium cobalt oxide material, $1.0 \leq x \leq 1.11$, $0 \leq y \leq 0.02$, $-0.2 < z < 0.2$ and A is one or more of Al, Mg, Ti, Zr and Y. And the coating layer is a lithium-depleted layer and can be denoted as $Li_aM_bB_cO_d$, wherein M is a lithium ion active metal element (i.e., Li-M oxide or Li-M salt with lithium ion deintercalation/intercalation activity) including but not limited to one or two or more of Co, Ni, Mn, and Mo, wherein B is an inactive doped element of the surface coating layer, and is one or two or more of Al, Mg, Ti, Zr, and Y, with $0.95 < b+c < 2.5$ and $1.8 < d < 4.2$. It is necessary to add a certain amount of a lithium-containing compound to the formation of lithium-depleted surface coating layer, and the molar ratio of Li to the transition metal of M is $0 < a/b < 11$, preferably $0.1 \leq a/b \leq 0.9$.

Preferably, the structure of the surface-active coating layer includes, but is not limited to, lamellar, spinel, olivine, and various corresponding type of structures transformed in the lithium deintercalation/intercalation process, preferably lamellar and spinel structures and various corresponding type of structures transformed in the lithium deintercalation/intercalation process. Preferably, the X-ray diffraction spectrum of the material is substantially still characterized by the layer structure of $\alpha$-$NaFeO_2$ after the formation of the lithium-deficient coating layer.

Preferably, the average particle diameter D50 (volume) of the lithium cobalt oxide in the inner core is between 5 μm and 25 μm, preferably 14 μm to 17 μm.

Preferably, the lithium-deficient coating methods on the surface of lithium cobalt oxide include, but are not limited to, mechanical mixing, co-precipitation, and emulsification coating etc.

Preferably, the cathode material after coating is sintered at least once to form a lithium-depleted surface coating layer, with a maximum sintering temperature between 900 and 1100° C. and an isothermal time at the maximum temperature of between 2 and 24 hours.

Preferably, the coating layer active metal element M is Ni and Mn, $0 < a/b < 1$, the total weight ratio of the coating layer Ni and Mn in the cathode material is in the range of 1000 to 20000 ppm, Ni/Mn in the coating layer (weight ratio) is between 100:0 and 0:100, preferably between 10:1 and 1:10, more preferably between 0.3 and 2.5; the coating layer inactive element B is one or two or more of Al, Mg, Ti, Y, and Zr.

Preferably, the pH of the cathode material is less than or equal to 11.0 and the free lithium is less than or equal to 120 ppm.

Preferably, the coating layer active metal element M is Co, Ni and Mn, $0 < a/b < 1$, and the total weight of the coating layer Co in the cathode material is less than 20 wt. %, preferably, the percentage of Co in the cathode material is less than 10 wt. % by weight, more preferably, the percentage of Co in the cathode material is less than or equal to 6.5 wt. %, And the total weight ratio of the coating layer Ni and the coating layer Mn in the cathode material is in the range of 1000 to 20000 ppm.

Preferably, the Ni/Mn (weight ratio) in the coating layer of the cathode material in the upper paragraph is between 100:0 and 0:100, preferably between 10:1 and 1:10, more preferably between 0.3 and 2.5; and the coating layer inactive element B is one or two or more of Al, Mg, Ti, Y and Zr.

Preferably, the pH of the above-mentioned cathode material is less than or equal to 11.0 and the free lithium of that is less than or equal to 120 ppm.

Preferably, the coating layer active metal element is Co, $0 < a/b < 1$, the percentage of the Co used in the coating layer is less than 20 wt. % by weight in the cathode material. Preferably, the percentage of Co is less than 10 wt. % by weight in the cathode material, more preferably, the percentage of Co is less than or equal to 6.5 wt. % by weight in the cathode material. The inactive element of the coating layer is one or two or more of Al, Mg, Ti, Y and Zr.

Preferably, the pH of the above-mentioned high-voltage lithium cobalt oxide material is less than or equal to 11.0 and the free lithium of that is less than or equal to 100 ppm.

Preferably, the above-mentioned cathode material can be directly applied to various lithium ion secondary batteries as a cathode active material (or a part of the cathode active material, and the ratio of above-mentioned cathode material to the cathode active material is 40%-100%) according to the design requirements.

Preferably, the powder X-ray diffraction spectrum of the prepared lithium-depleted coated cathode material of lithium cobalt oxide basically still shows a structural feature of $\alpha$-NaFeO$_2$ layer, and the ratio of the (003) characteristic peak intensity to the (104) characteristic peak intensity is >1.0.

Preferably, the powder X-ray diffraction spectrum of the prepared lithium-depleted coated cathode material of lithium cobalt oxide basically still shows a structural feature of $\alpha$-NaFeO$_2$ layer, and the ratio of the (110) characteristic peak intensity to the (018) characteristic peak intensity is between 0.5 to 1.4.

Preferably, the powder X-ray diffraction spectrum of the prepared lithium-depleted coated cathode material of lithium cobalt oxide basically still shows a structural feature of $\alpha$-NaFeO$_2$ layer, and the ratio of the (012) characteristic peak intensity to the (006) characteristic peak intensity is between 0.2 and 2.5.

The following specific examples can be further illustrated the cathode material of lithium cobalt oxide for lithium ion secondary battery in the present invention and preparation methods and applications thereof.

Example 1 Preparations of Cathode Material

A semi-finished product of lithium cobalt oxide with D50 of 25 μm and general formula Li$_{1.11}$Co$_{0.98}$Al$_{0.02}$O$_{2.055}$ was used as a core material to be coated.

The coating method was given as follows: 7 g of nickel acetate (containing four molecular crystal water), 15 g of manganese acetate (containing two molecular crystal water) and 6.5 g of nano-Y$_2$O$_3$ dispersion having a solid content of 10 wt. % were added to 1000 g of deionized water, and the mixture was stirred for 15 min to make the acetate completely dissolved. 500 g of the core material was added, and LiOH solution having a content of 5 wt. % was slowly dropped in, and the droplet velocity was controlled so as to increase the pH of the mixture gradually to 13 in 15 minutes and then the drop was stopped. After continuing stirring for 30 minutes, the liquid was filtered. The filtered material was dried at 120° C. for 10 hours, then heated to 900° C. (in 25 L/min of air atmosphere) at a rate of 8° C./min using a muffle furnace and sintered at a constant temperature for 4 hours. And a cathode material of lithium-depleted coated lithium cobalt oxide was prepared after natural cooling.

Wherein, a preparation method of the core material is given as follows: lithium carbonate, cobalto-cobaltic oxide (Cobalt(II,III)oxide) and aluminum oxide were added according to the stoichiometeric ratio of the core material, and then sintered at 1020° C. in an air atmosphere after mixing to obtain the core material.

The lithium-depleted coating layer is expressed as Li$_a$M$_b$B$_c$O$_d$.

It is calculated that the lithium ion active metal of M in the coating layer accounted for 1 wt. % by weight of the cathode material.

It is calculated that the molar ratio of a/b for lithium/active elements in the coating layer was between 0.2 and 0.6, and when b+c=1, the content b of the active element in the coating layer was 0.941, the content c of the inactive element was 0.059.

Wherein, the content of d can be inferred according to the electrical neutrality principle.

The cathode material of Example 1 was characterized as follows:

(1) Particle Size Analysis

The particle size of the sample described in Example 1 was measured using a laser particle size detector (manufacturer: Malvern, model: Mastersizer 2000) under the following conditions: water as a medium, wet sampling. The result was calculated based on volume distribution area.

(2) pH Value 5 g of the powder was added to 45 g of deionized water, and the mixture was magnetically stirred for 5 min, and filtrated. The filtrate was placed in water bath for 5 min at 26° C., and the result was detected by pH meter of Rex PHS-3C.

(3) Free Lithium Content

The detection process: titration.

30 g of powder sample was placed into 100 mL of deionized water, then the mixture was magnetically stirred for 30 min and filtrated using filter papers. 2 drops of phenolphthalein was added to 50 mL of filtrate and the solution was red. A standard hydrochloric acid (0.05 mol/L) was added while stirring until filtrate turned colorless and transparent. Added volume of hydrochloric acid was recorded as V0-V1. 2 drops of methyl red reagent was added to the filtrate and the solution turned yellow. A standard hydrochloric acid (0.05 mol/L) was added while stirring until the filtrate just turned orange. Added amount of hydrochloric acid was recorded as V1-V2. The filtrate was heated on an electric furnace. After boiling for 30 s, the solution returned to yellow from orange. A standard hydrochloric acid (0.05 mol/L) was added until the solution just turned to pink and the added volume of hydrochloric acid was recorded as V3-V4. The added amount of standard hydrochloric acid in deionized water sample was recorded as V5 according to the above method and used as the correction term. Calculation formula of free lithium was shown as follows:

$$Li^+ = (V2+V4-V3-V0-V5) \times C_{HCl} \times 1.3882/m_{sample}$$

Wherein, C$_{HCL}$ is the concentration of the standard hydrochloric acid and m$_{sample}$ is the weight of the sample.

(4) Compacted Density

The detection process is shown as follows:

First, the above mentioned cathode material of lithium-depleted coated lithium cobalt oxide was tuned into homogenate and coated on a current collector, and dried at 100-110° C. The conductive agent used in the size mixing process is conductive carbon Super P (manufacturer: Switzerland Timcal Company), the adhesive is PVDF (polyvinylidene fluoride), and the mass ratio of them is 96:2:2, the solvent used in the size mixing process was NMP (N-methyl pyrrolidone). The amount of NMP was dependent on the viscosity of the slurry which was controlled to be 3000-10000 mPaS. The current collector was Al foil with a thickness of 12 μm. The experiment was carried out on double roller cold press with roller diameter of 400 mm produced by Shaoyang Dali Company. The roller spacing and pressure were adjusted, and the density of the film, which was formed when the pole piece was folded and a needle eye appeared, was calculated as compacted density of the material.

(6) X-Ray Diffraction

The XRD pattern of the sample described in Example 1 was measured by an X-ray diffraction under the following conditions: CuKa Target, the graphite is a filter, wavelength λ=1.5418 Å, a scanning speed of 4°/min and 2θ range of 0° to 80°. The results were shown in FIG. 1.

The pH value of the material was 10.57 after detection, the content of free lithium was 43 ppm, and the maximum compacted density was 4.07 g/cm$^3$ when using 12 μm aluminum foil.

In FIG. 1, the powder X-ray diffraction spectrum was shown as α-NaFeO$_2$ layer structure with a ratio of the (003) characteristic peak intensity to the (104) characteristic peak intensity of 2.98, a ratio of the (110) characteristic peak intensity to the (018) characteristic peak intensity of 0.84, and a ratio of the (012) characteristic peak intensity to the (006) characteristic peak intensity of 1.20.

Wherein, 2θ of the (003) characteristic peak was 18-20°, 2θ of the (101) characteristic peak was 36.5-38.5, and 2θ of the (104) characteristic peak was 44.5-46.5°, 2θ of the (110) characteristic peak was 66-67°, 2θ of the (018) characteristic peak was 65-66°, 2θ of the (012) characteristic peak was 38-40°, 2θ of the (006) characteristic peak was 37.5-39.5°.

Example 2 Preparations of Cathode Material

A semi-finished product of lithium cobalt oxide with D50 of 5 μm and general formula $Li_1Co_{0.98}Mg_{0.02}O_{1.99}$ was used as a core material to be coated.

The coating method was given as follows: 1 kg of core material, 0.62 g of nano nickel carbonate $NiCO_3$, 1.46 g of manganese carbonate $MnCO_3$, 0.33 g of lithium carbonate $Li_2CO_3$, 1.27 g of nano yttrium oxide $Y_2O_3$, and 1.67 g of nano-$TiO_2$ were put in a ball mill to be milled, so as to make various ingredients uniformly coat the surface of the core material. The mixed material was heated to 900° C. (in 25 L/min of air atmosphere) at a rate of 8° C./min using a muffle furnace and sintered at a constant temperature for 24 hours. And a cathode material of lithium-depleted coated lithium cobalt oxide was prepared after natural cooling.

Wherein, a preparation method of the core material is similar to that of Example 1, the doped material was replaced with magnesium oxide, and sintering temperature was adjusted to 930° C.

The lithium-depleted coating layer is expressed as $Li_aM_bB_cO_d$.

It is calculated that the lithium ion active metal of M in the coating layer accounted for 0.1 wt. % by weight of the cathode material.

It is calculated that the molar ratio of a/b for lithium/active elements in the coating layer was 0.5, and when b+c=1, the content b of the active element in the coating layer was 0.375, the content c of the inactive element was 0.634.

The cathode material of Example 2 was characterized by the same method of Example 1. The pH value of the material was 10.82 after detection, the content of free lithium was 110 ppm, and the maximum compacted density was 4.03 g/cm$^3$ when using the 12 μm aluminum foil.

The powder X-ray diffraction spectrum was shown as α-NaFeO$_2$ layer structure with a ratio of the (003) characteristic peak intensity to the (104) characteristic peak intensity of 2.76, a ratio of the (110) characteristic peak intensity to the (018) characteristic peak intensity of 0.82, and a ratio of the (012) characteristic peak intensity to the (006) characteristic peak intensity of 1.21.

Example 3 Preparations of Cathode Material

A semi-finished product of lithium cobalt oxide with D50 of 20 μm and general formula $Li_{1.08}Co_{0.98}Zr_{0.02}O_{2.05}$ was used as a core material to be coated.

The coating method was given as follows: 1 kg of core material, 6.2 g of nano nickel carbonate $NiCO_3$, 14.6 g of manganese carbonate $MnCO_3$, 3.3 g of lithium carbonate $Li_2CO_3$, 1.89 g of aluminium oxide $Al_2O_3$, 1.67 g of nano magnesium oxide MgO and 1.67 g of nano-$TiO_2$ were put in a ball mill to be milled, so as to make various ingredients uniformly coat the surface of the core material. The mixed material was heated to 950° C. (in 25 L/min of air atmosphere) at a rate of 8° C./min using a muffle furnace and sintered at a constant temperature for 4 hours. And a cathode material of lithium-depleted coated lithium cobalt oxide was prepared after natural cooling.

Wherein, a preparation method of the core material is similar to that of Example 1, differences are that the doped material was replaced with zirconium oxide, and sintering temperature was adjusted to 1020° C.

The lithium-depleted coating layer is expressed as $Li_aM_bB_cO_d$.

It is calculated that the lithium ion active metal of M in the coating layer accounted for 1 wt. % by weight of the cathode material.

It is calculated that the molar ratio of a/b for lithium/active elements in the coating layer was 0.5, and when b+c=1, the content b of the active element in the coating layer was 0.642, the content c of the inactive element was 0.358.

The cathode material of Example 3 was characterized by the same method of Example 1. The pH value of the material was 10.67 after detection, the content of free lithium was 65 ppm, and the maximum compacted density was 4.08 g/cm$^3$ when using 12 μm aluminum foil.

The powder X-ray diffraction spectrum was shown as α-NaFeO$_2$ layer structure with a ratio of the (003) characteristic peak intensity to the (104) characteristic peak intensity of 3.66, a ratio of the (110) characteristic peak intensity to the (018) characteristic peak intensity of 0.83, and a ratio of the (012) characteristic peak intensity to the (006) characteristic peak intensity of 1.47.

Example 4 Preparations of Cathode Material

A semi-finished product of lithium cobalt oxide with D50 of 20 μm and general formula $Li_{1.07}CoO_{2.035}$ was used as a core material to be coated.

The coating method was given as follows: 1 kg of core material, 43.4 g of nano nickel carbonate $NiCO_3$, 6.65 g of lithium carbonate $Li_2CO_3$, 1.27 g nano yttrium oxide $Y_2O_3$, and 1.67 g of nano-$TiO_2$ were put in a ball mill to be milled, so as to make various ingredients uniformly coat the surface of the core material. The mixed material was heated to 950° C. (in 25 L/min of air atmosphere) at a rate of 8° C./min using a muffle furnace and sintered at a constant temperature for 4 hours. And a cathode material of lithium-depleted coated lithium cobalt oxide was prepared after natural cooling.

Wherein, a preparation method of the core material is similar to that of Example 1, differences are that the doped raw material was removed, and sintering temperature was adjusted to 960° C.

The lithium-depleted coating layer is expressed as $Li_aM_bB_cO_d$.

It is calculated that the lithium ion active metal of M in the coating layer accounted for 2 wt. % by weight of the cathode material.

It is calculated that the molar ratio of a/b for lithium/active elements in the coating layer was 0.5, and when b+c=1, the content b of the active element in the coating layer was 0.914, the content c of the inactive element was 0.086.

The cathode material of Example 4 was characterized by the same method of Example 1. The pH value of the material was 10.54 after detection, the content of free lithium was 63 ppm, and the maximum compacted density was 3.99 g/cm$^3$ when using 12 μm aluminum foil.

The powder X-ray diffraction spectrum was shown as α-NaFeO$_2$ layer structure with a ratio of the (003) characteristic peak intensity to the (104) characteristic peak intensity of 3.23, a ratio of the (110) characteristic peak intensity to the (018) characteristic peak intensity of 0.94, and a ratio of the (012) characteristic peak intensity to the (006) characteristic peak intensity of 1.42.

Example 5 Preparations of Cathode Material

A semi-finished product of lithium cobalt oxide with D50 of 8 μm and general formula Li$_{1.02}$Co$_{0.99}$Al$_{0.004}$Zr$_{0.006}$O$_{2.008}$ was used as a core material to be coated.

The coating method was given as follows: 1 kg of core material, 41.6 g of manganese carbonate MnCO$_3$, 6.7 g of lithium carbonate Li$_2$CO$_3$, 1.27 g of nano yttrium oxide Y$_2$O$_3$ and 1.67 g of nano-TiO$_2$ were put in a ball mill to be milled, so as to make various ingredients uniformly coat the surface of the core material. The mixed material was heated to 950° C. (in 25 L/min of air atmosphere) at a rate of 8° C./min using a muffle furnace and sintered at a constant temperature for 4 hours. And a cathode material of lithium-depleted coated lithium cobalt oxide was prepared after natural cooling.

Wherein, a preparation method of the core material is similar to that of Example 1, differences are that the doped material was replaced with aluminium oxide and zirconium oxide, and sintering temperature was adjusted to 960° C.

The lithium-depleted coating layer is expressed as Li$_a$M$_b$B$_c$O$_d$.

It is calculated that the lithium ion active metal of M in the coating layer accounted for 2 wt. % by weight of the cathode material.

It is calculated that the molar ratio of a/b for lithium/active elements in the coating layer was 0.5, and when b+c=2, the content b of the active element in the coating layer was 1.83, the content c of the inactive element was 0.17.

The cathode material of Example 5 was characterized by the same method of Example 1. The pH value of the material was 10.90 after detection, the content of free lithium was 115 ppm, and the maximum compacted density was 4.05 g/cm$^3$ when using the 12 μm aluminum foil.

The powder X-ray diffraction spectrum was shown as α-NaFeO$_2$ layer structure with a ratio of the (003) characteristic peak intensity to the (104) characteristic peak intensity of 2.09, a ratio of the (110) characteristic peak intensity to the (018) characteristic peak intensity of 0.91, and a ratio of the (012) characteristic peak intensity to the (006) characteristic peak intensity of 1.49.

Example 6 Preparations of Cathode Material

A semi-finished product of lithium cobalt oxide with D50 of 14 μm and general formula Li$_{1.08}$Co$_{0.99}$Al$_{0.008}$Mg$_{0.002}$O$_{2.024}$ was compounded by small granule lithium cobalt oxide of 8 μm and large granule lithium cobalt oxide of 20 μm, used as a core material to be coated.

The coating method was given as follows: 1 kg of core material, 40 g of nano cobalt carbonate CoCO$_3$, 6 g of nano nickel carbonate NiCO$_3$, 1.46 g of manganese carbonate MnCO$_3$, 9.6 g of lithium carbonate Li$_2$CO$_3$, and 1.67 g of nano-TiO$_2$ were put in a ball mill to be milled, so as to make various ingredients uniformly coat the surface of the core material. The mixed material was heated to 1000° C. (in 25 L/min of air atmosphere) at a rate of 8° C./min using a muffle furnace and sintered at a constant temperature for 6 hours. And a cathode material of lithium-depleted coated lithium cobalt oxide was prepared after natural cooling followed by sintering once more for 4 hours at 950° C.

Wherein, a preparation method of the core material is similar to that of Example 1, differences are that the raw material was replaced with aluminum oxide, magnesium oxide, the molar ratio of Li/Co in 20 μm large granule was adjusted to be 1.07, and sintering temperature was adjusted to 985° C., the molar ratio of Li/Co in small granule was adjusted to be 1.03, and sintering temperature was adjusted to 940° C.

The lithium-depleted coating layer is expressed as Li$_a$M$_b$B$_c$O$_d$.

It is calculated that the lithium ion active metal of M in the coating layer accounted for 3.56 wt. % by weight of the cathode material.

It is calculated that the molar ratio of a/b for lithium/active elements in the coating layer was 0.5, and when b+c=1, the content b of the active element in the coating layer was 0.96, the content c of the inactive element was 0.04.

The cathode material of Example 6 was characterized by the same method of Example 1. The pH value of the material was 10.58 after detection, the content of free lithium was 79 ppm, and the maximum compacted density was 4.16 g/cm$^3$ when using 12 μm aluminum foil.

The powder X-ray diffraction spectrum was shown as α-NaFeO$_2$ layer structure with a ratio of the (003) characteristic peak intensity to the (104) characteristic peak intensity of 2.32, a ratio of the (110) characteristic peak intensity to the (018) characteristic peak intensity of 0.90, and a ratio of the (012) characteristic peak intensity to the (006) characteristic peak intensity of 1.37.

Example 7 Preparations of Cathode Material

A semi-finished product of lithium cobalt oxide with D50 of 17 μm and general formula Li$_{1.06}$Co$_{0.995}$Al$_{0.002}$Mg$_{0.003}$O$_{2.023}$ was compounded by small granule lithium cobalt oxide of 8 μm and large granule lithium cobalt oxide of 20 μm, used as a core material to be coated.

The coating method was given as follows: 1 kg of core material, 100 g of nano cobalt hydroxide Co(OH)$_2$, 6.2 g of nano nickel carbonate NiCO$_3$, 1.46 g of nano manganese carbonate MnCO$_3$, 23.6 g of lithium carbonate Li$_2$CO$_3$, and 1.35 g of nano-ZrO$_2$ were put in a ball mill to be milled, so as to make various ingredients uniformly coat the surface of the core material. The mixed material was heated to 1000° C. (in 25 L/min of air atmosphere) at a rate of 8° C./min using a muffle furnace and sintered at a constant temperature for 6 hours. And a cathode material of lithium-depleted coated lithium cobalt oxide was prepared after natural cooling followed by sintering once more for 4 hours at 950° C.

Wherein, a preparation method of the core material is similar to that of Example 1, differences are that the raw material was replaced with aluminum oxide, magnesium oxide, the molar ratio of Li/Co in 20 μm large granule was adjusted to be 1.07, and sintering temperature was adjusted to 985° C., the molar ratio of Li/Co in small granule was adjusted to be 1.03, and sintering temperature was adjusted to 940° C.

The lithium-depleted coating layer is expressed as $Li_aM_bB_cO_d$.

It is calculated that the lithium ion active metal of M in the coating layer accounted for 7.34 wt. % by weight of the cathode material.

It is calculated that the molar ratio of a/b for lithium/active elements in the coating layer was 0.5, and when b+c=1, the content b of the active element in the coating layer was 0.991, the content c of the inactive element was 0.009.

The cathode material of Example 6 was characterized by the same method of Example 1. The pH value of the material was 10.32 after detection, the content of free lithium was 43 ppm, and the maximum compacted density was 4.14 g/cm³ when using 12 μm aluminum foil.

The powder X-ray diffraction spectrum was shown as α-NaFeO$_2$ layer structure with a ratio of the (003) characteristic peak intensity to the (104) characteristic peak intensity of 6.36, a ratio of the (110) characteristic peak intensity to the (018) characteristic peak intensity of 0.57, and a ratio of the (012) characteristic peak intensity to the (006) characteristic peak intensity of 0.33.

Example 8 Preparations of Cathode Material

A semi-finished product of lithium cobalt oxide with D50 of 20 μm and general formula $Li_{1.08}Co_{0.99}Al_{0.009}Y_{0.001}O_{2.04}$ was used as a core material to be coated.

The coating method was given as follows: 1 kg of core material, 30 g of cobalt hydroxide Co(OH)$_2$, 5.95 g of lithium carbonate Li$_2$CO$_3$, 1.89 g of aluminium oxide Al$_2$O$_3$, 1.67 g of magnesium oxide MgO and 1.67 g of nano-TiO$_2$ were put in a ball mill to be milled, so as to make various ingredients uniformly coat the surface of the core material. The mixed material was heated to 1100° C. (in 25 L/min of air atmosphere) at a rate of 8° C./min using a muffle furnace and sintered at a constant temperature for 2 hours. And a cathode material of lithium-depleted coated lithium cobalt oxide was prepared after natural cooling followed by sintering once more for 4 hours at 950° C.

Wherein, a preparation method of the core material is similar to that of Example 1, differences are that the raw material was replaced with aluminium oxide and yttrium oxide, and sintering temperature was adjusted to 985° C.

The lithium-depleted coating layer is expressed as $Li_aM_bB_cO_d$.

It is calculated that the lithium ion active metal of M in the coating layer accounted for 1.9 wt. % by weight of the cathode material.

It is calculated that the molar ratio of a/b for lithium/active elements in the coating layer was 0.5, and when b+c=1, the content b of the active element in the coating layer was 0.7631, the content c of the inactive element was 0.237.

The cathode material of Example 8 was characterized by the same method of Example 1. The pH value of the material was 10.38 after detection, the content of free lithium was 63 ppm, and the maximum compacted density was 4.21 g/cm³ when using 12 μm aluminum foil.

The powder X-ray diffraction spectrum was shown as α-NaFeO$_2$ layer structure with a ratio of the (003) characteristic peak intensity to the (104) characteristic peak intensity of 1.20, a ratio of the (110) characteristic peak intensity to the (018) characteristic peak intensity of 0.90, and a ratio of the (012) characteristic peak intensity to the (006) characteristic peak intensity of 2.20.

Example 9 Preparations of Cathode Material

A semi-finished product of lithium cobalt oxide with D50 of 15 μm and general formula $Li_{1.06}Co_{0.995}Al_{0.004}Mg_{0.001}O_{2.03}$ was compounded by small granule lithium cobalt oxide of 8 μm and large granule lithium cobalt oxide of 20 μm, used as a core material to be coated.

The coating method was given as follows: 1 kg of core material, 50 g of nano cobalt hydroxide Co(OH)$_2$, 9.9 g of lithium carbonate Li$_2$CO$_3$, 1.67 g of nano magnesium oxide MgO and 1.35 g of nano-ZrO$_2$ were put in a ball mill to be milled, so as to make various ingredients uniformly coat the surface of the core material. The mixed material was heated to 1100° C. (in 25 L/min of air atmosphere) at a rate of 8° C./min using a muffle furnace and sintered at a constant temperature for 2 hours. And a cathode material of lithium-depleted coated lithium cobalt oxide was prepared after natural cooling followed by sintering once more for 4 hours at 950° C.

Wherein, a preparation method of the core material is similar to that of Example 1, differences are that the raw material was replaced with aluminum oxide, magnesium oxide, the molar ratio of Li/Co in 20 μm large granule was adjusted to be 1.08, and sintering temperature was adjusted to 985° C., the molar ratio of Li/Co in small granule was adjusted to be 1.03, and sintering temperature was adjusted to 940° C.

The lithium-depleted coating layer is expressed as $Li_aM_bB_cO_d$.

It is calculated that the lithium ion active metal of M in the coating layer accounted for 3.17 wt. % by weight of the cathode material.

It is calculated that the molar ratio of a/b for lithium/active elements in the coating layer was 0.5, and when b+c=1, the content b of the active element in the coating layer was 0.91, the content c of the inactive element was 0.09.

The cathode material of Example 9 was characterized by the same method of Example 1. The pH value of the material was 10.16 after detection, the content of free lithium was 25 ppm, and the maximum compacted density was 4.20 g/cm³ when using 12 μm aluminum foil.

The powder X-ray diffraction spectrum was shown as α-NaFeO$_2$ layer structure with a ratio of the (003) characteristic peak intensity to the (104) characteristic peak intensity of 2.52, a ratio of the (110) characteristic peak intensity to the (018) characteristic peak intensity of 0.97, and a ratio of the (012) characteristic peak intensity to the (006) characteristic peak intensity of 1.07.

Example 10 Preparations of Cathode Material

A semi-finished product of lithium cobalt oxide with D50 of 15 μm and general formula $Li_{1.06}Co_{0.992}Ti_{0.004}Mg_{0.004}O_{2.03}$ was compounded by small granule lithium cobalt oxide of 8 μm and large granule lithium cobalt oxide of 20 μm, using as a core material to be coated.

The coating method was given as follows: 1 kg of core material, 100 g of nano cobalt hydroxide Co(OH)$_2$, 19.8 g of lithium carbonate Li$_2$CO$_3$, 1.67 g of nano magnesium oxide MgO, and 1.67 g of nano-TiO$_2$ were put in a ball mill to be ball-milling, so as to make various ingredients uniformly coat the surface of the core material. The mixed material was heated to 1050° C. (in 25 L/min of air atmosphere) at a rate of 8° C./min using a muffle furnace and sintered at a constant temperature for 8 hours. And a cathode material of lithium-depleted coated lithium cobalt oxide was prepared after natural cooling followed by sintering once more for 4 hours at 950° C.

Wherein, a preparation method of the core material is similar to that of Example 1, differences are that the raw material was replaced with titanium oxide and magnesium oxide, the molar ratio of Li/Co in 20 μm large granule was adjusted to be 1.08, and sintering temperature was adjusted to 1030° C., the molar ratio of Li/Co in small granule was adjusted to be 1.03, and sintering temperature was adjusted to 940° C.

The lithium-depleted coating layer is expressed as $Li_aM_bB_cO_d$.

It is calculated that the lithium ion active metal of M in the coating layer accounted for 6.34 wt. % by weight of the cathode material.

It is calculated that the molar ratio of a/b for lithium/active elements in the coating layer was 0.5, and when b+c=1, the content b of the active element in the coating layer was 0.945, the content c of the inactive element was 0.055.

The cathode material of Example 10 was characterized by the same method of Example 1. The pH value of the material was 9.74 after detection, the content of free lithium was 18 ppm, and the maximum compacted density was 4.21 g/cm³ when using 12 μm aluminum foil.

The powder X-ray diffraction spectrum was shown as α-NaFeO₂ layer structure with a ratio of the (003) characteristic peak intensity to the (104) characteristic peak intensity of 1.99, a ratio of the (110) characteristic peak intensity to the (018) characteristic peak intensity of 0.87, and a ratio of the (012) characteristic peak intensity to the (006) characteristic peak intensity of 1.55.

Example 11 Preparations of Cathode Material

A semi-finished product of lithium cobalt oxide with D50 of 15 μm and general formula $Li_{1.06}Co_{0.992}Al_{0.006}Mg_{0.002}O_{2.03}$ was compounded by small granule lithium cobalt oxide of 8 μm and large granule lithium cobalt oxide of 20 μm, used as a core material to be coated.

The coating method was given as follows: 1 kg of core material, 100 g of nano cobalt hydroxide Co(OH)₂, 19.8 g of lithium carbonate Li₂CO₃, 16.7 g of nano magnesium oxide MgO and 1.67 g of nano-TiO₂ were put in a ball mill to be milled, so as to make various ingredients uniformly coat the surface of the core material. The mixed material was heated to 1050° C. (in 25 L/min of air atmosphere) at a rate of 8° C./min using a muffle furnace and sintered at a constant temperature for 8 hours. And a cathode material of lithium-depleted coated lithium cobalt oxide was prepared after natural cooling followed by sintering once more for 4 hours at 950° C.

Wherein, a preparation method of the core material is similar to that of Example 1, differences are that the raw material was replaced with aluminum oxide, magnesium oxide, the molar ratio of Li/Co in 20 μm large granule was adjusted to be 1.08, and sintering temperature was adjusted to 985° C., the molar ratio of Li/Co in small granule was adjusted to be 1.03, and sintering temperature was adjusted to 940° C.

The lithium-depleted coating layer is expressed as $Li_aM_bB_cO_d$.

It is calculated that the lithium ion active metal of M in the coating layer accounted for 6.34 wt. % by weight of the cathode material.

It is calculated that the molar ratio of a/b for lithium/active elements in the coating layer was 0.5, and when b+c=1, the content b of the active element in the coating layer was 0.945, the content c of the inactive element was 0.055.

The cathode material of Example 11 was characterized by the same method of Example 1. The pH value of the material was 9.88 after detection, the content of free lithium was 17 ppm, and the maximum compacted density was 4.23 g/cm³ when using 12 μm aluminum foil.

The powder X-ray diffraction spectrum was shown as α-NaFeO₂ layer structure with a ratio of the (003) characteristic peak intensity to the (104) characteristic peak intensity of 2.07, a ratio of the (110) characteristic peak intensity to the (018) characteristic peak intensity of 1.11, and a ratio of the (012) characteristic peak intensity to the (006) characteristic peak intensity of 1.99.

Example 12 Preparations of Cathode Material

A semi-finished product of lithium cobalt oxide with D50 of 15 μm and general formula $Li_{1.06}Co_{0.992}Al_{0.006}Mg_{0.002}O_{2.03}$ was compounded by small granule lithium cobalt oxide of 8 μm and large granule lithium cobalt oxide of 20 μm, used as a core material to be coated.

The coating method was given as follows: 1 kg of core material, 100 g of nano cobalt hydroxide Co(OH)₂, 3.96 g of lithium carbonate Li₂CO₃, 1.67 g of nano magnesium oxide MgO and 1.67 g of nano-TiO₂ were put in a ball mill to be milled, so as to make various ingredients uniformly coat the surface of the core material. The mixed material was heated to 1050° C. (in 25 L/min of air atmosphere) at a rate of 8° C./min using a muffle furnace and sintered at a constant temperature for 8 hours. And a cathode material of lithium-depleted coated lithium cobalt oxide was prepared after natural cooling followed by sintering once more for 4 hours at 950° C.

Wherein, a preparation method of the core material is similar to that of Example 11.

The lithium-depleted coating layer is expressed as $Li_aM_bB_cO_d$.

It is calculated that the lithium ion active metal of M in the coating layer accounted for 6.34 wt. % by weight of the cathode material.

It is calculated that the molar ratio of a/b for lithium/active elements in the coating layer was 0.1, and when b+c=1, the content b of the active element in the coating layer was 0.945, the content c of the inactive element was 0.055.

The cathode material of Example 12 was characterized by the same method of Example 1. The pH value of the material was 9.32 after detection, the content of free lithium was 10 ppm, and the maximum compacted density was 4.07 g/cm³ when using 12 μm aluminum foil.

The powder X-ray diffraction spectrum was shown as α-NaFeO₂ layer structure with a ratio of the (003) characteristic peak intensity to the (104) characteristic peak intensity of 3.25, a ratio of the (110) characteristic peak intensity to the (018) characteristic peak intensity of 0.73, and a ratio of the (012) characteristic peak intensity to the (006) characteristic peak intensity of 0.88.

Example 13 Preparations of Cathode Material

A semi-finished product of lithium cobalt oxide with D50 of 15 μm and general formula $Li_{1.06}Co_{0.992}Al_{0.006}Mg_{0.002}O_{2.03}$ was compounded by small granule lithium cobalt oxide of 8 μm and large granule lithium cobalt oxide of 20 μm, used as a core material to be coated.

The coating method was given as follows: 1 kg of core material, 100 g of nano cobalt hydroxide $Co(OH)_2$, 35.64 g of lithium carbonate $Li_2CO_3$, 1.67 g of nano magnesium oxide MgO and 1.67 g of nano-$TiO_2$ were put in a ball mill to be milled, so as to make various ingredients uniformly coat the surface of the core material. The mixed material was heated to 1050° C. (in 25 L/min of air atmosphere) at a rate of 8° C./min using a muffle furnace and sintered at a constant temperature for 8 hours. And a cathode material of lithium-depleted coated lithium cobalt oxide was prepared after natural cooling followed by sintering once more for 4 hours at 950° C.

Wherein, a preparation method of the core material is similar to that of Example 11.

The lithium-depleted coating layer is expressed as $Li_aM_bB_cO_d$.

It is calculated that the lithium ion active metal of M in the coating layer accounted for 6.34 wt. % by weight of the cathode material.

It is calculated that the molar ratio of a/b for lithium/active elements in the coating layer was 0.9, and when b+c=1, the content b of the active element in the coating layer was 0.945, the content c of the inactive element was 0.055.

The cathode material of Example 13 was characterized by the same method of Example 1. The pH value of the material was 10.54 after detection, the content of free lithium was 57 ppm, and the maximum compacted density was 4.20 g/cm³ when using 12 μm aluminum foil.

The powder X-ray diffraction spectrum was shown as α-$NaFeO_2$ layer structure with a ratio of the (003) characteristic peak intensity to the (104) characteristic peak intensity of 2.04, a ratio of the (110) characteristic peak intensity to the (018) characteristic peak intensity of 1.35, and a ratio of the (012) characteristic peak intensity to the (006) characteristic peak intensity of 1.62.

Comparative Example 1

The core material of Example 11 to Example 13 is used as a core material to be coated.

The coating method was given as follows: 1 kg of core material, 100 g of nano cobalt hydroxide $Co(OH)_2$, 47.5 g of lithium carbonate $Li_2CO_3$, 1.67 g of nano magnesium oxide MgO and 1.67 g of nano-$TiO_2$ were put in a ball mill to be ball-milling, so as to make various ingredients uniformly coat the surface of the core material. The mixed material was heated to 1050° C. (in 25 L/min of air atmosphere) at a rate of 8° C./min using a muffle furnace and sintered at a constant temperature for 8 hours. And a cathode material of lithium-depleted coated lithium cobalt oxide was prepared after natural cooling followed by sintering once more for 4 hours at 950° C.

The lithium-depleted coating layer is expressed as $Li_aM_bB_cO_d$.

It is calculated that the lithium ion active metal of M in the coating layer accounted for 6.34 wt. % by weight of the cathode material.

It is calculated that the molar ratio of a/b for lithium/active elements in the coating layer was 1.0, and when b+c=1, the content b of the active element in the coating layer was 0.945, the content c of the inactive element was 0.055.

The cathode material of comparative example 1 was characterized by the same method of Example 1. The pH value of the material was 10.67 after detection, the content of free lithium was 92 ppm, and the maximum compacted density was 4.19 g/cm³ when using 12 μm aluminum foil.

The powder X-ray diffraction spectrum was shown as α-$NaFeO_2$ layer structure with a ratio of the (003) characteristic peak intensity to the (104) characteristic peak intensity of 2.07, a ratio of the (110) characteristic peak intensity to the (018) characteristic peak intensity of 0.97, and a ratio of the (012) characteristic peak intensity to the (006) characteristic peak intensity of 1.58.

Comparative Example 2

The core material of Example 11 to Example 13 is used as a core material to be coated.

The coating method of was given as follows: 1 kg of core material, 100 g of cobalt hydroxide, 1.67 g of magnesium oxide and 1.67 g of nano-$TiO_2$ without lithium carbonate were put in a ball mill to be ball-milling, so as to make various ingredients uniformly coat the surface of the core material. The mixed material was heated to 1050° C. (in 25 L/min of air atmosphere) at a rate of 8° C./min using a muffle furnace and sintered at a constant temperature for 8 hours. And a cathode material of lithium-depleted coated lithium cobalt oxide was prepared after natural cooling followed by sintering once more for 4 hours at 950° C.

The lithium-depleted coating layer is expressed as $Li_aM_bB_cO_d$.

It is calculated that the lithium ion active metal of M in the coating layer accounted for 6.34 wt. % by weight of the cathode material.

It is calculated that the molar ratio of a/b for lithium/active elements in the coating layer was 0, and when b+c=1, the content b of the active element in the coating layer was 0.945, the content c of the inactive element was 0.055.

The cathode material of comparative example 2 was characterized by the same method of Example 1. The pH value of the material was 9.17 after detection, the content of free lithium was 8 ppm, and the maximum compacted density was 4.10 g/cm³ when using 12 μm aluminum foil.

The powder X-ray diffraction spectrum was shown as α-$NaFeO_2$ layer structure with a ratio of the (003) characteristic peak intensity to the (104) characteristic peak intensity of 4.77, a ratio of the (110) characteristic peak intensity to the (018) characteristic peak intensity of 0.78, and a ratio of the (012) characteristic peak intensity to the (006) characteristic peak intensity of 0.73.

Comparative Example 3

To be similar to comparative example 1, the differences are the core material was replaced by that of Example 2. The a/b molar ratio of lithium to the active elements is still 1.0 right now.

Example 14 to Example 29 Preparations of a Lithium Ion Secondary Battery

The lithium-depleted coated lithium cobalt oxide prepared by methods of Example 1 to Example 13, and comparative example 1 to comparative example 3 respectively was used as a positive active material to prepare a soft-package lithium ion secondary battery with a capacity of 1.9-2.0 Ah.

The positive electrode active material of the battery was the above lithium-depleted coated lithium cobalt oxide, the conductive agent used in the size mixing process was conductive carbon Super P (manufacturer: Switzerland Timcal Company), and the bonding agent was PVDF (polyvinylidene fluoride), and the mass ratio of them is 96:2:2. The solvent used in the size mixing process was NMP (N-methyl-pyrrolidone), the collector was the Al foil.

The negative electrode active material of the battery was commercial artificial graphite (manufacturer: Hunan Shanshan New Material Co., Ltd., type: FSN-1), the conductive agent was Super P, the bonding agent was CMC (sodium carboxymethyl cellulose) and SBR (styrene-butadiene rubber), the solvent used in the size mixing process was the deionized water, the collector was the Cu foil.

The Commercial 4.35V electrolyte LBC-3045M4 (manufacturers: the New Zhoubang Technology Co., Ltd., electrolyte suitable for higher voltage will enable the battery to show better performance) were used as the electrolyte.

After processes of size mixing, coating, cold pressing, slitting, winding, top sealing/side sealing, baking, pouring, shaping, formatting, shaping, exhaust/sealing/cutting, grading etc., In the a capacity of 2.0 Ah, soft-package batteries with a length of 61 mm, a width of 42 mm, a thickness of 6 mm were prepared.

The battery was tested 25° C. 1 C discharge capacity in the range of 4.4V-3.0V, was conducted 45° C. 1 C/1 C charge and discharge cycle test in the range of 4.45V-3.0V (5V/6 A charge and discharge test equipment of Zhejiang Hangke Science and Technology Co., Ltd. were used, model: LIT-0506), the detection process is given as follows:

(1) Discharge Capacity

At 25° C., the battery was charged at a constant current of 1 C until the voltage reached 4.4V, then discharged at a constant current of 1 C until the voltage became 3.0V, and cycled three times. The capacity of the cathode material was calculated from the third discharge capacity.

$$C = C_{discharge} / [(m_{electrode} - m_{aluminum\ foil}) \times 0.83]$$

Wherein C is the capacity of the positive electrode material with a unit of mAh/g; $C_{discharge}$ is the third discharge capacity of the battery with a unit of mAh; $m_{electrode}$ is the mass of the positive electrode with a unit of g; $m_{aluminum\ foil}$ is the mass of the aluminum foil with a unit of g.

(2) Charge-Discharge Cycle Test

At 45° C., the battery was charged at a constant current of 1 C until the voltage reached 4.45V, then discharged at a constant current of 1 C until the voltage was 3.0V, and cycled 50 times. The capacity retention ratio was calculated.

The results are shown in the following table:

TABLE 1

Performance test results of cathode materials of Example 14 to Example 29

| Data Comparation | Positive active material | capacity mAh/g | 4.45 V 1 C/1 C 45° C. cycle 50 times capacity retention ratio |
|---|---|---|---|
| Example 14 | Example 1 | 173 | 75% |
| Example 15 | Example 2 | 176 | 74% |
| Example 16 | Example 3 | 173 | 70% |
| Example 17 | Example 4 | 165 | 79% |
| Example 18 | Example 5 | 176 | 85% |
| Example 19 | Example 6 | 171 | 77% |
| Example 20 | Example 7 | 171 | 88% |
| Example 21 | Example 8 | 172 | 79% |
| Example 22 | Example 9 | 172 | 92% |
| Example 23 | Example 10 | 171 | 95% |
| Example 24 | Example 11 | 172 | 96% |
| Example 25 | Example 12 | 164 | 80% |
| Example 26 | Example 13 | 172 | 87% |
| Example 27 | Comparative Example 1 | 170 | 85% |
| Example 28 | Comparative Example 2 | 161 | 73% |
| Example 29 | Comparative Example 3 | 173 | 63% |

Figure 2:
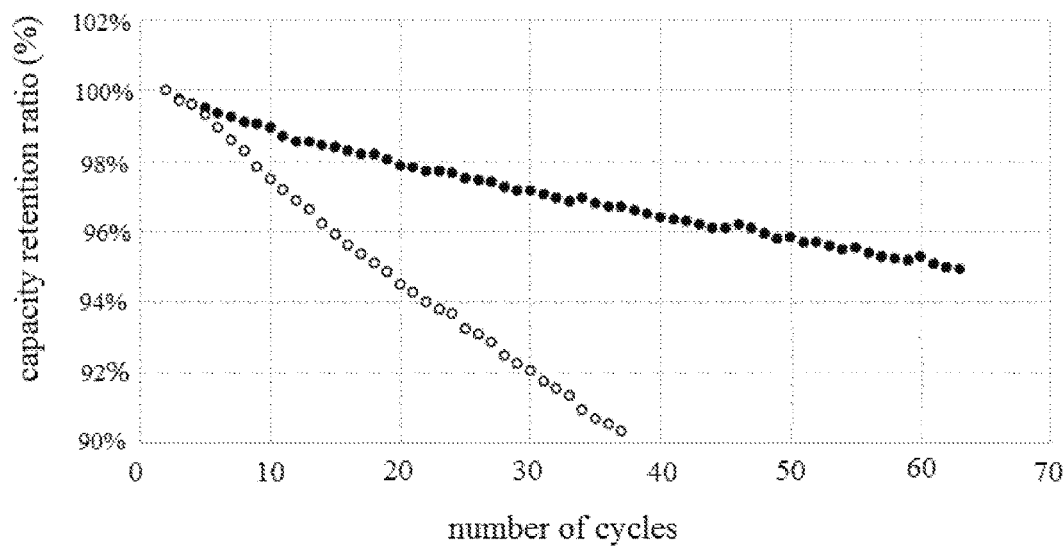
FIG. 2 is a graph showing the capacity retention ratio variation curve according to the number of cycles of the battery under the high-temperature and high-voltage conditions in Examples 26 and 27, wherein the solid circular curve is Example 26, and the open circular curve is Example 27.

As shown in the above table, preparation methods of the materials used in Examples 11 to 13, the Comparative example 1 to Comparative Example 2 were completely identical except the a/b ratio, which was 0.5, 0.1, 0.9, 1.0, 0 respectively. It can be clearly seen that the molar ratio of lithium/active element in the surface coating layer has a significant impact on the cycling performance. When a/b was too low, a large amount of inactive oxide formed on the surface coating layer, resulting in deactivation of the coated active element M, affecting the deintercalation/intercalation kinetics of the lithium ions on the surface, and thus leading to a capacity decrease of the material. At the same time, the inactive oxide adhered to the surface of the material, meanwhile, the surface topography of the material would be roughened, decreasing compacted density of the material (as indicated by the maximum compacted density data of Examples 12 and Comparative Example 2). When a/b was too high, the structural stability of the active coating layer under high voltage cycle was reduced. At the same time, the deintercalation/intercalation kinetics of lithium ions under high voltage cycle were affected, and thus leading to a deterioration of high voltage cycling performance (Example 13 and Comparative Example 1, the capacity retention ratio of Example 27 was lower than that of Example 26, as shown in FIG. 2). Example 11 (a/b=0.5) exhibited comprehensive properties of the optimum high voltage cycle, capacity and compacted density. The value of a/b should be controlled in an optimized interval range according to the kinds and amounts of the active coating elements.

The lithium-deficient coated active elements of Examples 1 to 5 were Ni and/or Mn, and the material exhibited a higher capacity. The lithium-deficient coated active element of Examples 8 to 13 was Co, and the material exhibited excellent high-temperature cycling stability. The advantages of both can be combined to obtain more excellent comprehensive properties. According to the attempts of Examples 6 and 7, the present inventors believed that the material can obtain better comprehensive performance while using Ni, Mn and Co as the active elements.

In order to further reduce the cost of the cathode material and improve the safety performance, the lithium-depleted coated lithium cobalt oxide prepared by the present invention can be mixed with other cathode materials for use as a cathode material for a lithium ion secondary battery, thus obtain a lithium-ion secondary battery with lower cost, better safety performance.

Example 30

Lithium-depleted coated lithium cobalt oxide of Example 11 and Commercial $LiNi_{0.5}Co_{0.2}Mn_{0.3}O_2$ (product model of ZH5000BDA) of Zhenhua New Materials Co., Ltd were mixed to be a cathode material of a lithium ion secondary battery. The ratio of the cathode material of lithium-depleted coated lithium cobalt oxide and the commercial coating doping modified material of $LiNi_{0.5}Co_{0.2}Mn_{0.3}O_2$ was 40%: 60%. This active material was prepared to be a soft-package lithium ion secondary battery having a length of 61 mm, a width of 42 mm and a thickness of 5 to 7 mm. The measured capacity of the 1 C at 25° C. was in the range of 1.90 to 1.95 Ah, which means the method in this example can improve the capacity of the battery, and obtain more reliable security performance and lower costs.

Example 31

Lithium-depleted coated lithium cobalt oxide of Example 11 and Commercial coating doping modified material of $LiNi_{0.5}Co_{0.2}Mn_{0.3}O_2$ (product model of ZH5000BDA) of Commercial Zhenhua New Materials Co., Ltd were mixed to be a cathode material of a lithium ion secondary battery. The ratio of the cathode material of lithium-depleted coated lithium cobalt oxide and the commercial $LiNi_{0.5}Co_{0.2}Mn_{0.3}O_2$ of Zhenhua New Materials Co., Ltd was 80%: 20%. A soft-package lithium ion secondary battery having a length of 61 mm, a width of 42 mm and a thickness of 5 to 7 mm was prepared. The measured capacity of the 1 C at 25° C. was in the range of 1.90 to 1.95 Ah, which means the method in this example can maintain the energy density, and obtain more reliable security performance and lower costs.

The lithium-depleted coated lithium cobalt oxide material provided by the present invention, can not only be used for soft-package batteries, but also can be used for other types of lithium ion secondary batteries, such as rectangular cells and cylindrical cells.

Example 32

Lithium-depleted coated lithium cobalt oxide of Example 11 and Commercial $LiNi_{0.5}Co_{0.2}Mn_{0.3}O_2$ (product model of ZH5000BDA) of Commercial Zhenhua New Materials Co., Ltd were mixed to be a cathode material of a lithium ion secondary battery. The ratio of the cathode material of lithium-depleted coated lithium cobalt oxide and the commercial coating doping modified material of $LiNi_{0.5}Co_{0.2}Mn_{0.3}O_2$ of Zhenhua New Materials Co., Ltd was 60%: 40%. This active material was used to prepare a aluminum shell lithium ion secondary battery having a length of 48 mm, a width of 30 mm and a thickness of 5 mm. The measured capacity of the 1 C at 25° C. was between the range of 0.947 to 0.955 Ah.

Example 33

Lithium-depleted coated lithium cobalt oxide of Example 11 was used as a cathode material of a lithium ion secondary battery. This active material was prepared to be cylindrical 18650 lithium ion secondary battery having a capacity of 2.6 Ah.

The batteries obtained in Examples 31 to 33 were conducted in charge-discharge test with voltage range of 3.0 V to 4.45 V at a test temperature of 25° C., with both charging and discharging current of 0.2 C. The test equipment was 5V/6 A battery charge and discharge tester of Zhejiang Hangke Science and Technology Co., Ltd. The charge-discharge curve was shown in FIG. 3.

Figure 3:
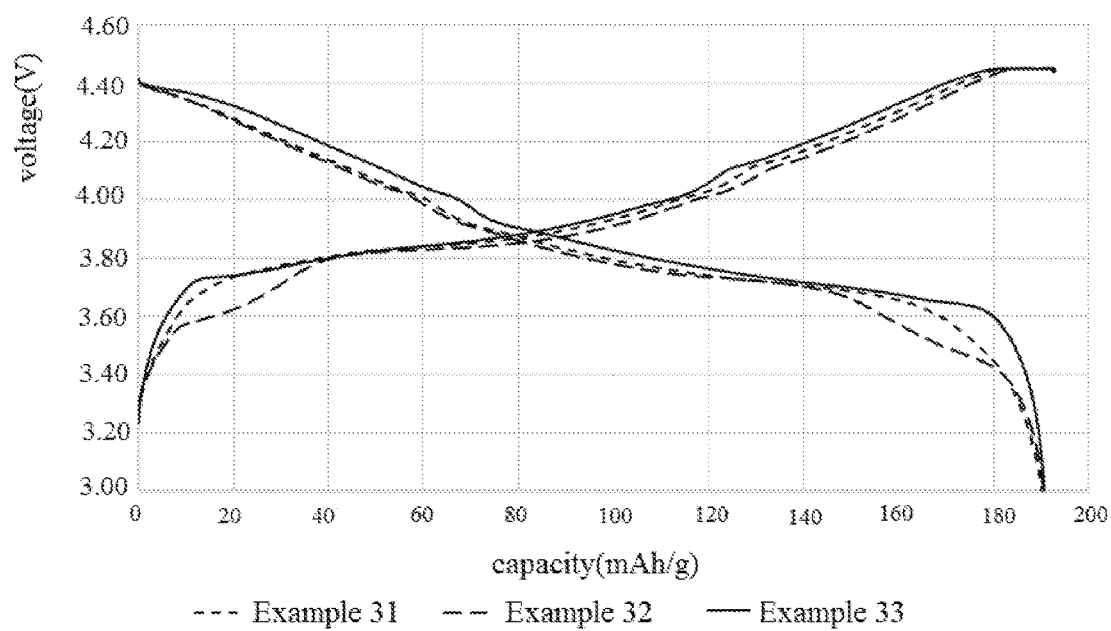
FIG. 3 is a graph showing the differences in the charge/discharge curves of different ratios of lithium-deficient active coated lithium cobalt oxide/ternary materials used in the lithium ion secondary batteries according to Example 31, Example 32 and Example 33.

FIG. 3 showed that the difference in the capacity of the battery reduced with the decrease of the weight ratio of the cathode material of lithium-depleted coated lithium cobalt oxide in the present invention, but the voltage plate is markedly different. The smaller the weight ratio of the cathode material of lithium-depleted coated lithium cobalt oxide, the lower the discharge platform and the lower the cost of the material.

As described above, the cathode material of lithium cobalt oxide for lithium ion secondary battery in the present invention can improve the high voltage cycling stability of battery, particularly the cycling stability at high temperature, thereby provide more excellent comprehensive performance, and has a broad application prospect.

The invention claimed is:

1. A cathode material of lithium cobalt oxide for a lithium ion secondary battery is characterized by comprising a core material and a coating layer,
wherein the core material is $Li_xCo_{(1-y)}A_yO_{(2+z)}$, wherein $1.0 \le x \le 1.11$, $0 \le y \le 0.02$, $-0.2 < z < 0.2$, and A is one or two or more selected from the group consisting of Al, Mg, Y, Zr and Ti,
wherein the coating layer is $Li_aM_bB_cO_d$, wherein M is a lithium ion active metal element, which is one or two or more selected from the group consisting of Co, Ni, Mn and Mo; and B is an inactive element, which is one or two or more selected from the group consisting of Al, Mg, Ti, Zr, and Y, and $0.95 < b+c < 2.5$, and the molar ratio of Li to the active metal element M is $0.1 \le a/b < 1$, $0.3 < b < 2$, and $1.8 < d < 4.2$.

2. The cathode material according to claim 1, wherein the weight percentage of lithium ion active metal M accounts for 0.1 wt. % to 10 wt. % of the cathode material in the coating layer.

3. The cathode material according to claim 1, wherein the weight percentage of lithium ion active metal M accounts for 0.8 wt. % to 8.5 wt. % of the cathode material in the coating layer.

4. The cathode material according to claim 1, wherein the molar ratio of Li to the active metal element M is $0.1 \le a/b \le 0.9$.

5. The cathode material according to claim 2, wherein the molar ratio of Li to the active metal element M is $0.1 \le a/b \le 0.9$.

6. The cathode material according to claim 1, wherein the molar ratio of Li to the active metal element M is $0.4 \le a/b \le 0.9$.

7. The cathode material according to claim 1, wherein $b/(b+c)$ is more than 0.3 and less than 1 in the coating layer.

8. The cathode material according to claim 2, wherein $b/(b+c)$ is more than 0.3 and less than 1 in the coating layer.

9. The cathode material according to claim 4, wherein $b/(b+c)$ is more than 0.3 and less than 1 in the coating layer.

10. The cathode material according to claim 1, wherein the active metal element M is one or two or more selected from the group consisting of Ni, Mn and Co.

11. The cathode material according to claim 2, wherein the active metal element M is one or two or more selected from the group consisting of Ni, Mn and Co.

12. The cathode material according to claim 4, wherein the active metal element M is one or two or more selected from the group consisting of Ni, Mn and Co.

13. The cathode material according to claim 10, wherein the active metal element includes Ni and Mn.

14. The cathode material according to claim 11, wherein the active metal element includes Ni and Mn.

15. The cathode material according to claim 12, wherein the active metal element includes Ni and Mn.

16. The cathode material according to claim 13, wherein the active metal elements are Co, Ni and Mn.

17. The cathode material according to claim 14, wherein the active metal elements are Co, Ni and Mn.

18. The cathode material according to claim 15, wherein the active metal elements are Co, Ni and Mn.

19. The cathode material according to claim 1, wherein y is more than or equal to 0 and less than or equal to 0.01 in the core material.

20. The cathode material according to claim 2, wherein y is more than or equal to 0 and less than or equal to 0.01 in the core material.

21. The cathode material according to claim 4, wherein y is more than or equal to 0 and less than or equal to 0.01 in the core material.

22. The cathode material according to claim 19, wherein y is more than or equal to 0.005 and less than or equal to 0.01 in the core material.

23. The cathode material according to claim 1, wherein z is more than or equal to −0.1 and less than or equal to 0.1 in the core material.

24. The cathode material according to claim 2, wherein z is more than or equal to −0.1 and less than or equal to 0.1 in the core material.

25. The cathode material according to claim 4, wherein z is more than or equal to −0.1 and less than or equal to 0.1 in the core material.

26. The cathode material according to claim 10, wherein z is more than or equal to −0.1 and less than or equal to 0.1 in the core material.

27. The cathode material according to claim 19, wherein z is more than or equal to −0.1 and less than or equal to 0.1 in the core material.

28. The cathode material according to claim 1, wherein the structure of the cathode material is selected from the group consisting of α-NaFeO$_2$ layer, spinel or olivine structure.

29. The cathode material according to claim 28, wherein a X-ray diffraction spectrum of the cathode material is shown as an α-NaFeO$_2$ layer structure containing (003), (104), (110), (018), (012) and (006) characteristic peaks, wherein, the ratio of the (003) characteristic peak intensity to the (104) characteristic peak intensity is greater than 1.0.

30. The cathode material according to claim 29, wherein a ratio of the (110) characteristic peak intensity to the (018) characteristic peak intensity is between 0.5 and 1.4.

31. The cathode material according to claim 29, wherein a ratio of the (012) characteristic peak intensity to the (006) characteristic peak intensity is between 0.2 and 2.5.

32. The cathode material according to claim 1, wherein the particle diameter of the core material is 5 μm to 25 μm.

33. The cathode material according to claim 32, wherein the particle diameter of the core material is 14 μm to 17 μm.

34. A preparation method for preparing the cathode material of claim 1, which is characterized by comprising the following steps:
    mixing a compound containing constituent elements of the coating layer as raw materials according to the stoichiometric ratio, adding the core material and sintering the obtained mixture to obtain the cathode material.

35. The preparation method according to claim 34, wherein the compound is selected from the group consisting of oxides, hydroxides, oxyhydroxides, carbonates, sulfates, nitrates and organometallic compounds of the constituent elements.

36. The preparation method according to claim 34, the process of sintering includes the following steps:
    a first sintering in the temperature range of 900 to 1100° C. for a period of 2 to 24 hours.

37. The preparation method according to claim 35, the process of sintering includes the following steps:
    a first sintering in the temperature range of 900 to 1100° C. for a period of 2 to 24 hours.

38. The preparation method according to claim 36, the process of sintering further comprises the following steps:
    a second sintering in the temperature range of 600-1100° C. for a period of 2 to 24 hours.

39. The preparation method according to claim 37, the process of sintering further comprises the following steps:
    a second sintering in the temperature range of 600-1100° C. for a period of 2 to 24 hours.

40. A cathode material composition for a lithium ion secondary battery, which is characterized by comprising a cathode material of lithium cobalt oxide in a weight fraction of 40% to 100%,
    wherein the cathode material comprises a core material and a coating layer,
    wherein the core material is $Li_xCo_{(1-y)}A_yO_{(2+z)}$, wherein 1.0≤x≤1.11, 0≤y≤0.02, −0.2<z<0.2, and A is one or two or more selected from the group consisting of Al, Mg, Y, Zr and Ti,
    wherein the coating layer is $Li_aM_bB_cO_d$, wherein M is a lithium ion active metal element, which is one or two or more selected from the group consisting of Co, Ni, Mn and Mo; and B is an inactive element, which is one or two or more selected from the group consisting of Al, Mg, Ti, Zr, and Y, and 0.95<b+c<2.5, and the molar ratio of Li to the active metal element M is 0.1≤a/b<1, 0.3<b<2, and 1.8<d<4.2.

41. The cathode material composition for a lithium ion secondary battery according to claim 40, wherein the weight percentage of lithium ion active metal M accounts for 0.1 wt. % to 10 wt. % of the cathode material in the coating layer.

42. The cathode material composition for a lithium ion secondary battery according to claim 40, wherein the molar ratio of Li to the active metal element M is 0.1≤a/b≤0.9.

43. A positive electrode of a lithium ion battery prepared by a raw material containing a cathode material of lithium cobalt oxide as a cathode active material,
    wherein the cathode material comprises a core material and a coating layer,
    wherein the core material is $Li_xCo_{(1-y)}A_yO_{(2+z)}$, wherein 1.0≤x≤1.11, 0≤y≤0.02, −0.2<z<0.2, and A is one or two or more selected from the group consisting of Al, Mg, Y, Zr and Ti,
    wherein the coating layer is $Li_aM_bB_cO_d$, wherein M is a lithium ion active metal element, which is one or two or more selected from the group consisting of Co, Ni, Mn and Mo; and B is an inactive element, which is one or two or more selected from the group consisting of Al, Mg, Ti, Zr, and Y, and 0.95<b+c<2.5, and the molar ratio of Li to the active metal element M is 0.1≤a/b<1, 0.3<b<2, and 1.8<d<4.2.

44. The positive electrode of a lithium ion battery according to claim 43, wherein the weight percentage of lithium ion active metal M accounts for 0.1 wt. % to 10 wt. % of the cathode material in the coating layer.

45. The positive electrode of a lithium ion battery according to claim 43, wherein the molar ratio of Li to the active metal element M is 0.1≤a/b≤0.9.

46. The positive electrode of a lithium ion battery according to claim 43, wherein the active metal element M is one or two or more selected from the group consisting of Ni, Mn and Co.

47. A lithium ion battery prepared by using the positive electrode of a lithium ion battery of claim 43.

48. A use of the cathode material of claim 1 in the lithium electric energy field.

49. A use of the lithium ion battery of claim 47 in the lithium electric energy field.

* * * * *